United States Patent [19]

Smith et al.

[11] Patent Number: 5,509,131
[45] Date of Patent: Apr. 16, 1996

[54] SYSTEM FOR POINTER UPDATING ACROSS PAGED MEMORY

[75] Inventors: Christopher E. Smith, El Toro; Howard J. Keller, Carlsbad; Robert L. Noble, Lake Elsinore, all of Calif.

[73] Assignee: Unisys Corporation, Blue Bell, Pa.

[21] Appl. No.: 493,058

[22] Filed: Jun. 21, 1995

Related U.S. Application Data

[63] Continuation of Ser. No. 781,551, Oct. 22, 1991, abandoned.

[51] Int. Cl.[6] .................................................. G06F 12/10
[52] U.S. Cl. ........................................ 395/416; 395/417
[58] Field of Search ............................... 395/400, 425, 395/403, 416, 417; 365/49

[56] References Cited

U.S. PATENT DOCUMENTS

| | | | |
|---|---|---|---|
| 4,669,043 | 5/1987 | Kaplinsky | 395/425 |
| 4,794,521 | 12/1988 | Ziegler et al. | 395/425 |
| 4,811,206 | 3/1989 | Johnson | 395/400 |
| 5,053,951 | 10/1991 | Nusinov et al. | 395/425 |
| 5,321,836 | 6/1994 | Crawford et al. | 395/400 |

OTHER PUBLICATIONS

Hayes, John P., "Computer Architecture and Organization," McGraw–Hill, 1978, pp. 370–375.

*Primary Examiner*—Jack A. Lane
*Attorney, Agent, or Firm*—Alfred W. Kozak; Mark T. Starr; Robert R. Axenfeld

[57] ABSTRACT

A method and system for updating the logical address of pointers used by a processor in a paged memory organization. A logical address associative memory provides a cache holding data about a paged segment of data words eliminating the need to fetch the data from main memory. Update index logic and insertion logic operate to update the logical address of an original pointer to indicate the logical next address of new data sought from main memory. The system is specifically designed to expedite the situation where the page referenced by the next address is different from that referenced by the original pointer's address.

9 Claims, 10 Drawing Sheets

FIG.2.1

| PHYSICAL ADDRESS | ASD NUMBER | PAGE INDEX |
|---|---|---|
| 5019 | 17 | 19 |
| ⋮ | ⋮ | ⋮ |
| 5006 | 30 | 6 |
| 5005 | 25 | 5 |
| 5004 | 40 | 4 |
| 5003 | 120 | 3 |
| 5002 | 90 | 2 |
| 5001 | 60 | 1 |
| 5000 | 20 | 0 |

| PHYSICAL ADDRESS | ASD WORD | |
|---|---|---|
| | ⋮ | |
| 5 | ASD WORD 2 OF ASD NUMBER 1 | |
| 4 | ASD WORD 1 OF ASD NUMBER 1 | |
| 3 | ASD WORD 4 OF ASD NUMBER 0 | ⎫ |
| 2 | ASD WORD 3 OF ASD NUMBER 0 | ⎬ FOUR WORDS FOR EACH ASD NO. |
| 1 | ASD WORD 2 OF ASD NUMBER 0 | |
| 0 | ASD WORD 1 OF ASD NUMBER 0 | ⎭ |

| ASD # | ASD1 WORD | ASD2 WORD | ASD3 WORD | | ASD4 |
|---|---|---|---|---|---|
| | BASE ADDR. OF SEGMENT | LENGTH OF SEGMENT | PAGE # | ASD # OF PAGE TABLE | |
| 0 | | | | | |
| 1 | | | | | |
| 10 | 4000 | 200 | — | — | |
| 30 | 2000 | 4096 | 6 | 15 | — |

| P | I | SIZE | WI | CI | ASD NUMBER |
|---|---|---|---|---|---|

FIG. 2.4

| P | I | SIZE | WI | ASD NUMBER |
|---|---|---|---|---|

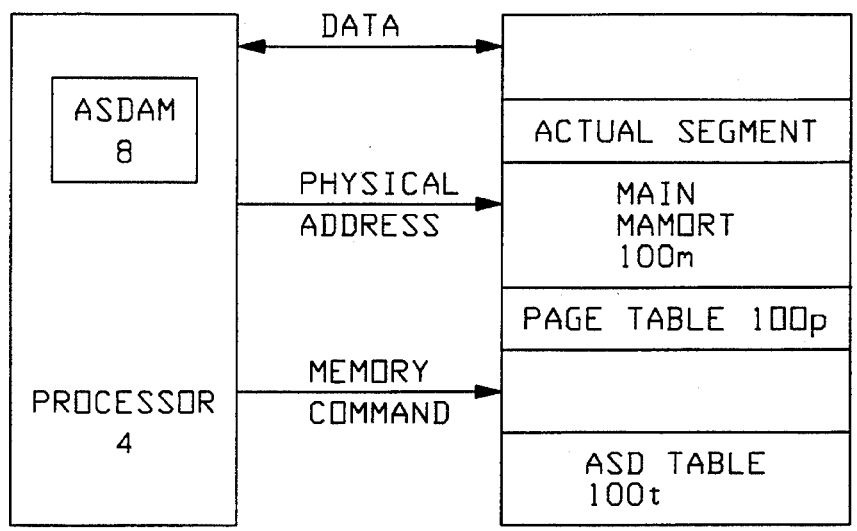
FIG.3.1
| SEGMENT ASD CAM | |
|---|---|
| V | PAGE TABLE ASD |
| | |
| | (20) |
| P.T. ASD CAM | |
|---|---|
| PAGE TABLE ASD | |
| PAGE ASD | |
| (30) | |
| PAGE INDEX CAM | |
|---|---|
| V | PAGE INDEX |
| V | (UNUSED) |
| | (50) |
| ADDRESS RAM |
|---|
| PAGE TABLE ADDRESS |
| |
| (50) |
| ASD RAM |
|---|
| PAGE ASD |
| PAGE TABLE ASD |
| (60) |
| PAGE INDEX RAM |
|---|
| (UNUSED) |
| PAGE INDEX |
| (70) |
FIG.3.2

SEGMENT ASD CAM

|   |   |    |
|---|---|----|
| 0 | 1 | 50 |
| 1 | 1 | 35 |
| 2→| 0 |    |
| 3 | 0 |    |
|   | (20) | |

P.T. ASD CAM

|   |   |    |
|---|---|----|
| 0 |   | 15 |
| 1 |   | 15 |
| 2 |   | 30 |
| 3→|   |    |
|   | (30) | |

PAGE INDEX CAM

|   |   |    |
|---|---|----|
|   | 1 | 4  |
|   | 1 | 1  |
|   | 1 | (UNUSED) |
|   | 0 |    |
|   | (40) | |

ADDRESS RAM

|   |      |
|---|------|
| 0 | 1000 |
| 1 | 2000 |
| 2 |      |
| 3 |      |
|   | (50) |

ASD RAM

|   |    |
|---|----|
| 0 | 40 |
| 1 | 60 |
| 2 | 15 |
| 3 |    |
|   | (60) |

PAGE INDEX RAM

|   |          |
|---|----------|
| 0 | (UNUSED) |
| 1 | (UNUSED) |
| 2 | 6        |
| 3 |          |
|   | (70) |

FIG.3.3

| LN | SEGMENT ASD CAM | | LN | P.T. ASD CAM | | PAGE INDEX CAM | |
|---|---|---|---|---|---|---|---|
| 0 | 1 | 50 | 0 | 15 | 1 | 4 | |
| 1 | 1 | 35 | 1 | 15 | 1 | 1 | |
| 2 | 1 | 15 | 2 | 30 | 1 | (UNUSED) | |
| 3→ | 0 | | 3 | | 1 | 0 | |
| 4 | 0 | | 4 | | 1 | 2 | |
| 5 | 0 | | 5→ | | 0 | | |
| | (20) | | | (30) | | (40) | |

| LN | ADDRESS RAM | LN | ASD RAM | PAGE INDEX RAM |
|---|---|---|---|---|
| 0 | 1000 | 0 | 40 | (UNUSED) |
| 1 | 2000 | 1 | 60 | (UNUSED) |
| 2 | | 2 | 15 | 6 |
| 3 | | 3 | 20 | (UNUSED) |
| 4 | | 4 | 90 | (UNUSED) |
| 5 | | 5 | | |
| | (50) | | (60) | (70) |

FIG. 6A

| P | I | SIZE | WI | CI | ASD NUMBER |
|---|---|------|----|----|------------|
| 1 | 1 | '4-BIT' | 2 | 4 | 90 |

FIG. 6B

| P | I | SIZE | WI | CI | ASD NUMBER |
|---|---|------|----|----|------------|
| 1 | 1 | '4-BIT' | 10 | 6 | 30 |

FIG. 7B

| P | I | SIZE | WI | CI | ASD NUMBER |
|---|---|------|----|----|------------|
| 1 | 1 | '4-BIT' | 3996 | 5 | 40 |

FIG. 8

| LN | SEGMENT ASD CAM | | LN | P.T. ASD CAM | | PAGE INDEX CAM | |
|---|---|---|---|---|---|---|---|
| 0 | 1 | 50 | 0 | | 15 | 1 | 4 |
| 1 | 1 | 35 | 1 | | 15 | 1 | 1 |
| 2 | 1 | 15 | 2 | | 30 | 1 | (UNUSED) |
| 3 → | 0 | | 3 | | | 1 | 0 |
| 4 | 0 | | 4 | | | 1 | 2 |
| 5 | 0 | | 5 | | | 0 | (UNUSED) |
| | | | 6 | | | 1 | 6 |
| | | | 7 → | | | 0 | |
| | (20) | | | (30) | | (40) | |

| LN | ADDRESS RAM | LN | ASD RAM | PAGE INDEX RAM |
|---|---|---|---|---|
| 0 | 1000 | 0 | 40 | (UNUSED) |
| 1 | 2000 | 1 | 60 | (UNUSED) |
| 2 | | 2 | 15 | 6 |
| 3 | | 3 | 20 | (UNUSED) |
| 4 | | 4 | 90 | (UNUSED) |
| 5 | | 5 | 15 | 2 |
| | | 6 | 30 | (UNUSED) |
| | | 7 | | |
| | (50) | | (60) | (70) |

FIG. 7A

SYSTEM FOR POINTER UPDATING ACROSS PAGED MEMORY

This is a continuation of application Ser. No. 07/781,551, filed on Oct. 22, 1991, now abandoned.

FIELD OF THE INVENTION

This disclosure relates to systems of updating pointers for use in a computer processor, especially in the updating of pointers across the pages of a paged region of memory.

CROSS REFERENCES TO RELATED APPLICATIONS

This disclosure, in regard to the use of content addressable memories, is related to co-pending patent applications:

"Data Caching and Address Translation System With Rapid Turnover Cycle", filed on Feb. 22, 1991 as application Ser. No. 660,455 which issued as U.S. Pat. No. 5,283,882;

"Dual Ported Content Addressable Memory Cell and Array", filed Nov. 19, 1990 as application Ser. No. 615,941 which issued as U.S. Pat. No. 5,226,005;

"Extended Address Translation System for Pointer Updating in Paged Memory Systems", filed Jun. 13, 1991 as application Ser. No. 714,480.

These application disclosures are included herein by reference.

BACKGROUND OF THE INVENTION

Memory referencing in a computer system typically follows one of two paradigms; a physical address model or a virtual address model. The physical model is most direct and therefore fast. A limitation of the physical model is the requirement that programs be written to run within the bounds of the particular computer system physical memory space and at specific locations within that physical memory space. The virtual model is much more flexible, but the time required to translate from virtual space to physical space at run time can contribute detrimentally to the general performance of the computer system.

The definition of physical memory is the implementation, in physical devices, of a storage medium such that storage locations are physically contiguous from "0", or the lowest address, to some upper bound that is limited by the nature of the storage medium, the storage medium may allow random access to the individual storage locations or sequentially to the individual storage locations depending upon the nature of the physical storage medium. A computer system memory storage medium is typically implemented as Dynamic random Access Memory integrated circuits, the granularity of memory is also important to this discussion. Granularity refers to the smallest physical number of memory bits that can be addressed by the computer system hardware. This is defined as a memory word and the width in bits is dictated by the physical architecture of the computer system. A memory word may consist of one or more bytes (eight bit words) of data.

There are two general models of mapping program data and program code structures onto a physical memory space. These are the segmentation model and the paged model. An important definition is that of a "block". A block of memory is the amount of physical memory large enough to contain a segment, in the segmented model, or one page, in the paged model.

The segmentation model is the most space efficient since it reserves exactly the amount of physical space, in words, required to exactly store the program data or code structures. A big disadvantage to the segmentation model is the requirement to map the entire virtual segment into a block of contiguous physical space. Large program code and data structures tend to limit the number of different programs that can co-exist in physical memory due to virtual segment size requirements, and therefore limit the multi-processing capability of the computer system.

The paged model requires that physical memory be broken down into chunks of uniformly sized blocks of memory, called pages, each block containing the same amount of contiguous physical memory. The page size (block size) is usually fixed by the physical architecture of the computer system and is typically in power of 2 sizes (i.e. a page may be a block of 256, 512, 1024, etc. words of contiguous physical memory.). An advantage of the paged model is that it eliminates the requirement of maintaining an entire program data or code structure in physical memory; the individual pages that make up the program data or code structure may be located in any order anywhere in physical memory. The paging model allows for efficient multi-programming by allowing some of the pages of a program's is code or data structure to be swapped out of physical memory and be replaced by pages from some other unrelated program. The paged memory model allows implementation of efficient virtual to physical address translation mechanisms if page size is a power of 2. A major disadvantage of the paged model is the waste of physical memory space that occurs when program code and data structures are smaller than the space required for a page.

The ideal implementation of a physical model would allow some combination of the segmented and paged models. This invention defines the embodiment of an efficient mechanism that implements a combined paged-segmented model and specifically the mechanism for the efficient processing of bi-directional page boundary crossings. This invention allows the efficiency of smaller non-swappable blocks and the resulting performance improvements to multiprocessing, along with the conversation of memory space allowed by the segmented model.

The logical implementation of a virtual memory system that would be a user of the paged-segmented physical model will typically use a logical structure called a "Pointer" to provide the virtual address in the virtual address model. The pointer is an abstract device that allows a program to reside in virtual rather than physical memory space and therefore detached from the physical implementation. This allows for efficient multi-processing since the only effect that physical memory size has on the computing environment is one of performance.

Translations of virtual addresses to physical addresses in a paged memory system are typically implemented in special mechanisms known in the art as Translation Look-a-side Buffers. These can be implemented in special hardware structures to improve efficiency, but sometimes are implemented as "soft" code routines. The mechanism in this embodiment consists of a unique implementation of a content addressable memory (CAM) that allows for efficient translation of paged segments and onpaged segments in hardware.

This invention utilizes this CAM, now to be called the Actual Segment Descriptor Associative Memory (ASDAM) to implement the paged-segmented model. The pointer, that is the virtual address, is a logical structure that contains an index value, called an "ASD number", and a displacement that will e utilized to provide the final information required to point to the first physical word in a physical block of memory. The "ASD number", from the pointer, is an index into a special structure existing in physical memory that is known as the Actual Segment Descriptor Table. An entry in this table is really a structure that consists of four words (a word in this embodiment contains six bytes of data).

The "ASD Number" is the means of identifying a block of contiguous physical memory. Every block of contiguous physical memory has a unique ASD Number, assigned by the operating system. The correspondence between the ASD Number and the physical location of the block is provided by a four word entry in the ASD Table. An ASD Number in this embodiment is 23 binary bits in length, limited by the allowable field width of the ASD Number field within the pointer. The displacement field, mentioned previously, consists of a 20 bit wide field that is also limited by the allowable field width of the Displacement field within the pointer.

In this embodiment, the physical blocks of memory are called "Actual Segments". In this embodiment, an Actual Segment may refer to a block containing contiguous words of physical memory that may be less or more than one page size. The blocks containing more than one page size of words are reserved for special cases and are not typical. This embodiment allows for a mixture of "pure" virtual segments along with "paged" virtual segments; with the term "virtual segments" referring to the virtual addressing environment. A "pure" virtual segment acts as defined by the segmented model. This allows the efficiency of the pure segmented model for virtual segment sizes that would be smaller than a page size.

An example of a "pure" virtual segment would e a 100 word actual segment (assuming a page size of 4096 words). As will be shown, this pure virtual segment, which consists of one actual segment, can be located in physical memory by means of it's ASD Number from it's pointer utilizing the proper entries in the ASD Table.

For program data and code structures larger than a page size, a paged-segmented model is implemented. This means that a data or code virtual segment, represented in the paged-segmented model, actually consists of a modulo page-size-number of pages (actual segments) terminated by an actual segment of less than one page-size number of words. A paged-segmented example would be a data virtual segment consisting of a 9233 word virtual segment actually composed of two actual segment pages (assume 4096 word page size) and terminated with a 1041 word actual segment. Each of the two page size actual segments, along with the 1041 word actual segment have a unique ASD Number and corresponding ASD Table entry. Because of this, neither the actual segments containing the two pages nor the termination actual segment containing the 1041 remaining words are required to be contiguous with one another. The implementation of the ASDAM mechanism and pointer updating mechanisms allow for efficient access to this complex structure.

The paged-segmented model is implemented in this embodiment via a hierarchical pointer structure. Just as each virtual segment is referenced by a virtual pointer, each page is also referenced by it's own virtual pointer. This results in an overall environment where a pure virtual segment is addressed by only a single virtual pointer, whereas a paged virtual segment, represented by the paged-segmented model, is a two level hierarchy of virtual pointers; the first level consisting of a single virtual pointer representing the overall virtual segment, and the second level consisting of virtual pointers representing the pages within that virtual segment. The collection of virtual pointers representing the pages of the virtual segment are contained in an actual segment known as the "Page Table". The virtual pointers continued in the Page Table each contain an ASD Number that references a unique ASD table entry representing each page. The Page Table actual segment is referenced via an entry in the ASD Table similar to any other actual segment. In this embodiment the first level pointer, representing the virtual segment, contains an ASD Number that references the page Table via the ASD Table while the displacement field within the first level pointer indirectly references the desired physical word. The pointer hardware mechanism of this embodiment efficiently allows the transformation from a virtual segment address via two levels of virtual pointers to the final physical address required at run time.

GENERAL OVERVIEW

A pointer is a data structure used in a program to locate a block of memory or target a particular data word within a block. They are commonly used in many programming languages and allow powerful and elegant programs to be written but they can cause reductions in program execution speed because of the processing overhead. Because of the frequency with which pointer operations occur in program execution, it is critical to a processor's performance to handle them efficiently. The program itself, plus any data which may be required by the processor, is stored in main memory during execution. These blocks of memory, or 'segments', may be contiguous (an 'actual segment') or divided into a number of 'pages' for easier memory management (a 'virtual segment'). A page is an actual segment of fixed size. These virtual or 'paged' segments allow efficient use of the processor's memory resources but again they can introduce a substantial overhead to maintain.

The ASD (Actual Segment Descriptor) system of virtual memory management system allows any address in main memory to be referenced by identifying the block of contiguous memory wherein the targeted data word lies, plus the displacement of the word from the base of the block. The 'ASD number' is the means of identifying a block of contiguous memory, when using the ASD system. Every block of contiguous memory has a unique ASD number, assigned by the operating system. The correspondence between the ASD number and the physical location of the block is provided by a table in main memory called the ASD table. An ASD number as used here is 23 binary bits in length, limited by the amount of room in the pointers that have to contain them, while the base displacement value is 20 bits in length.

The purpose of the ASD system is to allow logical addressing, whereby programs referencing data can be written and compiled without knowledge of the physical address of the data in main memory. It is kept track of by the operating system. The ASD system of memory management allows data to be referenced throughout a region of memory much larger than addressable systems using a 23-bit base address plus 20-bit displacement. This is done by using the ASD table to map the ASD number to a 32 bit base address.

The main memory, as illustrated herein, is comprised of 48-bit words and these are grouped into actual segments, or contiguous regions. Each of these is given an ASD number. The ASD table, stores, for each ASD number, the physical address of the beginning or 'base' of the actual segment and its length. If the actual segment is one of the pages of a 'virtual segment', then the ASD number of its page table and the number of the page is also stored in the ASD table. The length of a page is 4096 data words in this system. A page table is an actual segment of memory which contains the ASD numbers of the various pages which comprise a given paged-segment. The ASD number of the first page is at the first location, the second at the second location etc. Every virtual segment has its own page table which resides in memory. An example of a page table is shown in FIG. 2.1.

There are 4 words of data, called the ASD words, (FIG. 2.2a), associated with each ASD number. These contain information about the segment. The ASD table stores the ASD words for every actual segment currently in use by the processor. The ASD table resides at a fixed location, physical address zero. The ASD words associated with ASD number 0 are stored at memory addresses 0 through 3. For ASD number 1, they are stored at locations 4 through 7, and so on for all ASD numbers. The physical address of the base of the actual segment is stored in the first word, called ASD1. The length of the actual segment is stored in the second word, ASD2.

If the ASD number indicates an actual segment which is part of a virtual segment, then the third word in the table, ASD3, contains the ASD number of the page table and the page index of that page. The final word, ASD4, is reserved for software use and has no function in the current system. It may be seen therefore that to translate an ASD number into a physical address of its ASD1 word, it is necessary to multiply the ASD number by 4. Similarly, to form the address of an ASD2 or ASD3 word, it is necessary to multiply by 4 and add 1 or 2. The ASD table is shown in FIG. 2.2a and 2.2b.

Pointers are initially 'unindexed' (P=0) in which form they point to an entire region of memory. Once the program 'indexes' the pointer, it points to a specific 'element' in memory and can be used to reference that element either for reading or writing. An element is the unit of data of which a data segment is comprised. The element type or 'size' may be single precision data words (48 binary bits), double precision data words (96 bits) or characters of either 4 or 8 bits in length. Character elements are not written to or read from memory individually but grouped into 48 bit words. Thus a character is accessed by reading, from memory, the word in which it resides and then extracting the character from the word within the operating processor. The pointer contains information as to the type of the elements in the segment at which it points as well as whether the actual segment is paged. The structure of word and character pointers is shown in FIGS. 2.3 and 2.4.

The pointer also contains an ASD number indicating to which actual segment it is pointing. An indexed (I=1) pointer also contains a 'word index' (WI) or displacement from the base of the segment to the word at which it points. If it is a character pointer, i.e. a pointer which points to character data, then it contains a 'character index' (CI) indicating which character within the word is being identified. The word index and character index together are called the "index field".

A pointer contains information as to whether the actual segment to which it points, is one discrete page of a virtual segment. An unpaged pointer (P=0), i.e. a pointer which points to an unpaged-segment, always contains the ASD number of that segment. A paged pointer (P=1), i.e. one that points to a paged-segment, if it is unindexed, contains the ASD number of the virtual segment's page table. If it is indexed, it contains the ASD number of the particular page at which it points. The action of indexing a pointer by an index value involves replacing the ASD number, if paged, and updating the index field of the pointer.

Indexed pointers may also be 're-indexed' when an "additional" index value is added to the present index field. In the case of a paged-segment, this may cause a pointer which originally pointed to an element in one page of the segment to point at an element in a "different" page. This is referred to as a 'page crossing'. When the re-index is complete, the pointer once again contains the ASD number of the page at which it points and the displacement from the base of that page to the particular word or character.

The "index value" is provided by the processor in terms of the number of pages, words and characters by which the pointer should be indexed. These elements are referred to as the page index, word index and character index. It may be indicated that in re-indexing, the index value may be positive or negative, that is incrementing in locational position or decrement lug the locational position. The data elements may be single words, double words or characters. Characters are either 4 or 8 bits in size and these are stored 12 characters or 6 characters per memory word, respectively.

A Content Addressable Memory (CAM) is a memory structure whose function is to indicate which of the internal data locations Contains a data word presented to it as a "searchkey". A data word is initially written into the CAM at a location indicated by an address input and thereafter, if the exact same data appears on the searchkey input, an indication of a match, called a 'hit flag' is asserted and the 'location number' (LN) of the data location containing the searchkey data is also provided as an output. The location number output of a CAM may be used as an address input to a RAM. The RAM then provides, as an output, the data residing at the location corresponding to the location number of the original match in the CAM.

Without the use of the ASDAM (Actual Segment Descriptor Associated Memory) system, pointers are updated by a combination of hardware and microcode. Conventionally, a Translation Lookaside Buffer (TLB) is used in the formation of physical addresses from virtual addresses. The ASD number of an actual segment is stored in a CAM, with the physical address of the base in the corresponding location of a RAM. To form a physical address into a segment, the ASD number is supplied to the CAM, and then, if there is a hit, the RAM supplies the address of the base of the actual segment. The required displacement is added to this to form the address of the word in main memory. The TLB eliminates the need to read the base address from the ASD table in memory, after the first time, and speeds up referencing of data from frequently used segments. Since page tables are actual segments in memory, the ASD numbers of page tables may also be stored in the Cam with the physical address of the base of the page table stored in the RAM. Even with the TLB, the updating of pointers into virtual segments can be a slow process. Indexing is conventionally achieved as follows:

1. Indexing of unpaged pointers: The index value is inserted directly into the index field of the pointer. The ASD number in the pointer is that of the unpaged-segment and is not changed. The indexed bit is set.

2. Re-indexing of unpaged pointers: This is the same as the above case except the index value is added to the original pointer's value field and the total is inserted into the index field of the pointer.

3. Indexing of paged pointers: The ASD number of the page table is extracted from the unindexed pointer and used to search the TLB CAM. If there is a hit, the physical address of the base of the page table is provided. If there is a miss in the TLB, then the ASD number is converted into the physical address of the location in main memory containing the base address and a memory fetch initiated. Once the base address of the page table is available, it is added to the page index of the index value to form the address of the location in the page table which contains the ASD number of the particular page at which the pointer will point. The data at this address is then fetched from memory. This ASD number, when it returns, is inserted into the pointer with the word and character indices from the index value. The indexed bit is set. This process takes several machine cycles plus 1 or 2 memory accesses.

4. Re-indexing of paged pointers: The ASD number in the original pointer is that of the page in which the word resides that is originally referenced by the pointer. The index field is extracted from the pointer and added to the page, word and character indices from the index value. The result forms an updated word and character index and an incremental page index, showing how many pages from the original page the pointer must be moved. It may be noted that a pointer does not contain any information as to which page of a virtual segment it is. At this point, the incremental page index is simply a page index relative to the original page. If the incremental page index is zero, then the updated pointer still points at a word in the original page and no update of the ASD number is necessary. In this case, the updated word and character indices are inserted into the pointer and the update is complete.

However, if the incremental page index formed is other than zero, the updated pointer references a word outside of the original page and a "page crossing" must take place. In this case, the page ASD number in the original pointer must be replaced by the ASD number of the destination page. This information is contained in the segment's page table at a displacement of the destination page index. The page ASD number from the pointer is used to form the physical address of the ASD3 word (FIG. 2.2b) of the segment. This is fetched from memory and contains the ASD number of the virtual segment's page table and the page index of the original page. The original page index is added to the incremental page index to give the page index of the destination page. This is the displacement from the base of the page table where the ASD number of the destination page is stored. The ASD number of the page table is used to search the TLB (Translation Lookaside Buffer, FIG. 1, 20, 50 as in case 3 above and the "base address" of the page table is either found in the RAM 50 or fetched from memory. The destination page index is added to this to form the address of the location containing the destination page ASD number and this is fetched from memory. This ASD number is inserted into the pointer, along with the updated word and character indices and the update is complete. This process takes many machine cycles plus 2 or 3 memory accesses. The presently described ASDAM system eliminates the need for many machine cycles.

It is the page crossing of case 4 above that the herein described ASDAM system is designed to expedite. Without it, page crossings are slow and inefficient. Many machine cycles are consumed and much microcoded control is required. The volume of memory traffic is substantially increased, and this is now obviated by the present system.

When the instruction currently being executed by the processor indicates that a pointer needs to be updated, the pointer and the index value are provided to the ASDAM system, FIG. 1. The Extract Logic 5 locates the ASD number from the pointer and this is applied to the both Segment ASD CAM (20) and the Page Table ASD CAM (30) and the respective hit flags indicate whether this ASD number is present. Simultaneously, the page index is applied to the Page Index CAM (40). The hit flag indicates whether this page index is present.

The Control Logic (100) determines whether the pointer is paged or unpaged and indexed or unindexed and which of the 3 CAMs scored hits in their searches. Based on this information, the Control Logic is able to determine what information is required for the particular update and whether it is present in the ASDAM (8). Memory requests are initiated to fetch any missing data. The searchkey data which scored the miss and caused the memory fetch is stored in a location of that CAM. When the data returns, it is stored in the corresponding location of the appropriate RAM. When all the data is present, the pointer update is restarted and completed.

The indexing and re-indexing of "unpaged pointers", as previously described, is accomplished in a single machine cycle. Since the ASD number in the pointer does not change, the CAMs and RAMs are not used and their hit flags and outputs are ignored.

The indexing of pointers to "paged" segments of word data may be accomplished in a single machine cycle, using the ASDAM system. The ASD number contained in the pointer initially is that of the page table for the virtual segment. The page index and ASD number are used to search the Page Table ASD CAM (30) and the Page Index CAM (40) respectively. If both are present, then the data in the corresponding location of the ASD RAM (60) is the ASD number of the destination page. This ASD number is inserted by the Insert Logic 95 into the pointer along with the word index and character index, if any, and the index operation is completed.

If there is "not" a hit in the same location of both the Page Table ASD CAM (30) and the Page Index CAM (40), then the required data is not present in the ASD RAM (60) and must be fetched from memory 100M. If there is a hit found in the simultaneous search for this page table ASD number in the Segment ASD CAM (20), then the corresponding location in the Address RAM (50) contains the physical address of the base of the page table of this virtual segment. In this case, the page index is added to the page table base to form the address of the location in main memory which contains the ASD number of the destination page. A Read request to memory is issued to fetch this data, which is stored on its return in the ASD RAM (60) while its corresponding page table ASD number and page index are stored in the Page Table ASD CAM (30) and Page Index CAM (40). The pointer update is then restarted and this time the Page Table ASDCAM and the Page Index CAM both yield hits and the operation is completed.

If there are not hits in both Page Table ASD CAM (30) and Page Index CAM (40) and there is not a hit in the Segment ASD CAM (20), then the base address of the page table must be fetched from memory. The ASD number of the page table is translated (by the Memory Request Logic 80) into the physical address of its ASD1 word, containing the address of the base of the page table. A memory read is initiated to return this ASD1 word and it is stored in a location in the Address RAM (50). The page table ASD number is stored in the Segment ASD CAM (20) at the corresponding location. Thus when the pointer update is restarted, the Segment ASD CAM (20) shows a hit while the hit flags from the other two CAMs (30 and 40) remain unchanged. Now operation continues as described above, with the ASD number of the destination page being fetched and stored in the ASDRAM (60). When the pointer update is restarted for the second time, it will complete without further delay.

Re-indexing of pointers to paged-segments can be easily achieved if the destination word is in the same page as the original word, i.e. if the sum of the original Word Index (WI) and Character Indices (CI) and the new indices from the index value is not so great as to exceed the bounds of the original page. The pointer already contains the ASD number of the original page so all that remains is to insert the new word and character indices into the index field of the pointer. The CAMs and RAMs are not required and the hit flags and outputs are ignored.

However, a "page crossing" may occur, i.e. the sum of the original index field and the index value may yield a word index greater than the number of words in a page. Two searches of the ASDAM CAMs are required in this case and after the first one is successful, the ASDAM Control Logic (100) causes the processor to hold for 2 machine cycles while the second one is performed. The first search identifies the page table ASD number of the segment and page index of the original page. The second search identifies the ASD number of the destination page. The ASD number of the original pointer is used to search the Page Table ASD CAM (30). If a hit is found, then the data in the corresponding location of the ASD RAM 60 is the ASD Number of the Page Table and the data in that location of the Page Index RAM (70) is the page index of the original page.

If there is no hit in the Page Table ASD CAM (30), then the ASD number is translated into the physical memory address of the ASD3 (FIG. 2.2*b*) word and a memory read initiated by the Memory Request Logic (80). When the data returns, the page table ASD Number is stored in the ASD RAM (60) and the page index is stored in the Page Index RAM (70). The ASD number of the page is stored in the corresponding location of the Page Table ASD CAM (30). The pointer update is then restated and this time a hit is found in the Page Table ASD CAM (30). The page index of the original page, supplied by the Page Index RAM (70), along with the original pointer index field, is added to the index value to form a destination page, word and character index. This is performed by the Update Index Logic (90). Once the hit in the Page Table ASD CAM (30) has been achieved, the 2 cycle hold is invoked. During these 2 cycles, the ASD number of the page table, supplied by the ASDRAM (60) and the destination page index from the Update Index Logic 80 are applied to the Page Table ASD CAM (30) and Page Index CAM (40) respectively. If hits are found in both CAMs then the data associated with them in the ASD RAM (60) is the page index of the destination page. The Insert Logic (95) then inserts this into the pointer along with the destination word and character indices supplied by the Update Index Logic 90 and the pointer update is complete.

If both hits are not found in these CAMs (30, 40), then the data must be fetched from main memory, 100M. At the end of the 2 cycle hold, a Read Request is initiated exactly as in the indexing of a paged pointer previously described. If there is a hit (on the ASD Number supplied by the ASDRAM 60) in the Segment ASDCAM (20), the base of the page table, supplied by the address RAM 50, is used with the destination page index to fetch the destination ASD number. If the ASD number of the page table is not present in the Segment ASD CAM (20), then the base address of the page table is fetched and stored in the Address RAM (50). Each time there is a miss and data has to be fetched and the update restarted, the page table ASD number and page index must be read out of the RAMs (60 and 70) and a 2 cycle hold invoked. At the end of the hold, either more data is fetched from main memory 100M, or the pointer update is complete.

Re-indexing with page crossings take 3 machine cycles using the ASDAM system, if all data is present in the RAMs. No memory accesses are required. Even if no data is originally present, the hardware assistance provided to address generating and dynamic control functions means that it will complete faster than conventional microcoded implementations.

Typically programs, during execution, reference a small number of data segments many times and each page of a virtual segment is accessed many times. The updating of pointers therefore requires the same ASD numbers to be accessed many times. The ASDAM system is a small cache, located within the processor, for providing these ASD numbers. Hit rates of over 90% are regularly achieved, having a significant effect on overall processor performance. Special purpose hardware is also provided to form memory addresses to reference missing data and to sum the original page index and index field with the index value. The hardware also extracts the ASD number from the original pointer and merges the destination ASD number and word and character indices back into the pointer. These hardware functions save the machine cycles and microcode that would be required to perform the same functions using the general purpose processing hardware.

Thus the ASDAM is a hardware system for updating pointers. Short microcode routines are dynamically invoked to load the CAMs and RAMs when missing data is detected. This allows the primary microcode to be optimized with the assumption that all data will be present locally in the processor and the update will occur in a single machine cycle. The hardware takes all necessary action to fetch missing data and restart the operation. The ASDAM system also allows primary microcode to treat all pointers the same whether they are indexed or unindexed, paged or unpaged. The hardware distinguishes dynamically and indexes them correctly. By reducing all pointers to a single category, the microcode requirement is further reduced. Another strength of the ASDAM system is that, despite its high hit rate, it is able to anticipate misses, by simultaneously performing searches and generating addresses to be used in the event that all data is not present. Thus if a miss is detected, the Control Logic (100) can dynamically initiate fetch request to memory without wasting a single machine cycle. If the data is present, the update is completed and the fetch request and its address are discarded. Given CAM hits and no page crossings, the ASDAM system can perform back to back paged pointer updates at the rate of one per machine cycle indefinitely. The ASDAM can perform back to back pointer updates with page crossings at the rate of one per three machine cycles. This provides advantageous efficiencies over situations without the ASDAM, which require many more machine cycles.

In the particular processor associated with this system, the microcode is entirely contained within VLSI silicon die. Microcode memory space is therefore at a premium and savings achieved by using the ASDAM system increases performance by making space for additional optimizations in other routines, as well as the direct savings in updating pointers.

GLOSSARY

ACTUAL SEGMENT: A contiguous region of main memory.

ACTUAL DESCRIPTOR (ASD): A set of 4 words used to describe an ACTUAL SEGMENT. The ASD contains the BASE address and the LENGTH of the segment. If it is one PAGE of a VIRTUAL SEGMENT, then it also contains its PAGE INDEX and the ASD NUMBER of the PAGE TABLE.

ASD NUMBER: A means for identifying a block of contiguous memory (segment). Every block of contiguous main memory has a unique ASD Number (assigned by the operating system). It is used to associate each block of memory with a set of 4 ASD words.

ACTUAL SEGMENT DESCRIPTOR ASSOCIATIVE MEMORY (ASDAM): A local cache system for performing ADDRESS TRANSLATION in a computer system using the ASD system of main memory management.

ADDRESS RAM: One of the 3 RAMs used by the ASDAM system, this 32-bit wide by 16-word deep RAM contains the PHYSICAL ADDRESSES of PAGE TABLES for use in ADDRESS TRANSLATION.

ADDRESS TRANSLATION: The process by which LOGICAL ADDRESSES are turned into PHYSICAL ADDRESSES.

ASD RAM: One of the 3 RAMs used by the ASDAM system, this 23-bit wide by 8-word deep Ram contains the ASD numbers of PAGES and PAGE TABLES for use in address translation.

ASD TABLE: A table in main memory maintained by the computer operating system to associate ASD NUMBERS with their ASD words. It always begins at PHYSICAL ADDRESS 0.

ASD WORDS: A set of 4 words, associated with each ASD Number, which are stored in the ASD table. These words contain the physical base address of the actual segment, its length, the ASD Number of the Page Table of the virtual segment, and the page index of the page.

BASE: The PHYSICAL ADDRESS of the first word of an ACTUAL SEGMENT in main memory.

CAM (CONTENT ADDRESSABLE MEMORY): A memory structure which is used to compare a data item with the set of data items already stored within itself. A match results in a HIT FLAG and LOCATION NUMBER being provided.

CHARACTER INDEX: A number used in identifying a particular character position within a 48-bit data word. It may take the range 0 to 5 for 8-bit data and 0 to 11 for 4-bit data. It is stored within the POINTER as part of the INDEX FIELD.

CONTROL LOGIC: A part of the ASDAM system providing overall control to the memories and associated logic blocks. The control logic is responsible for interpreting the various requirements of the operator being executed and initiating the actions necessary for the ASDAM to complete it.

DESTINATION PAGE INDEX: The number identifying which page of a VIRTUAL SEGMENT a pointer will reference after an INDEX or RE-INDEX operation has been performed.

HIT FLAG: An output from a CAM indicating whether a match on the searchkey data has been found.

INDEX BIT: A 1-bit field within a POINTER which indicates whether the pointer has been indexed or not.

INDEX FIELD: A region within an INDEXED POINTER indicating the displacement from the base of the ACTUAL SEGMENT of the data word referenced by the POINTER. It has no significance in the case of an UNINDEXED POINTER.

INDEX VALUE: A number of data elements supplied by the processor to the ASDAM. It indicates by how many data elements the pointer should be incremented during the INDEXING or RE-INDEXING operation.

INDEXED POINTER: A pointer which has been previously indexed, i.e. one with the INDEX BIT set. Such a pointer indicates a single data element in main memory.

INDEXING: The action of updating an UNINDEXED POINTER by applying an INDEX VALUE. The result is an INDEXED POINTER referencing a data element corresponding to that INDEX VALUE.

LENGTH: The number of data words in an ACTUAL SEGMENT in main memory.

LOCATION NUMBER: An output from a CAM indicating, when a match on the searchkey data has been found, which location contains the matching data.

LOGICAL ADDRESS: A reference to a word in main memory, with an offset relative to the BASE of an ACTUAL SEGMENT and an ASD NUMBER indicating that SEGMENT via the ASD TABLE.

MEMORY ADDRESS: The identifier of a location in main memory.

MEMORY COMMAND: An instruction issued by the processor to main memory requesting either a read operation from the accompanying address or a write operation using the accompanying address and data.

MEMORY REQUEST LOGIC: A part of the ASDAM system which, upon direction from the CONTROL LOGIC, forms PHYSICAL ADDRESSES and issues MEMORY COMMANDS to the main memory.

ORIGINAL INDEX FIELD: The INDEX FIELD contained within the POINTER before the RE-INDEXING operation is performed.

ORIGINAL PAGE INDEX: The PAGE INDEX of the page referenced by the ORIGINAL INDEXED POINTER. This is stored in the ASD3 word of the ASD Number in the pointer.

ORIGINAL POINTER: The POINTER before the INDEXING or REINDEXING operation is performed.

PAGE: An ACTUAL SEGMENT of fixed size, i.e. 4096 words in the system described.

PAGE CROSSING FLAG: A signal, generated by the UPDATE INDEX LOGIC, indicating that the RE-INDEXING operation being performed has resulted in the DESTINATION POINTER referencing a data word in different PAGE of a VIRTUAL SEGMENT from the ORIGINAL POINTER.

PAGE INDEX: The identifying number of a particular PAGE within a VIRTUAL SEGMENT.

PAGE INDEX CAM: One of the 3 CAMs of the ASDAM system, this 12-bit wide by 8-word deep CAM is used to store the PAGE INDICES of PAGES whose ASD NUMBERS are stored in the ASD RAM.

PAGE TABLE: An ACTUAL SEGMENT associated with a VIRTUAL SEGMENT and containing the ASD NUMBERS of each of the PAGES of the segment.

PAGE TABLE ASD CAM: One of the 3 CAMs of the ASDAM system, this 23-bit wide by 8-word deep CAM is used to store the ASD NUMBERS of various PAGES and PAGE TABLES for use by the ASDAM in updating POINTERS.

PAGE INDEX RAM: One of the 3 RAMs of the ASDAM system, this 12-bit wide by 8-word deep Ram stores the PAGE INDICES of various PAGES used for ADDRESS TRANSLATION.

PAGED BIT: A 1-bit field within a POINTER which indicates whether the region of main memory referenced by the POINTER is paged or not.

PAGED MEMORY: A method of organizing main memory such that data is divided into PAGES, i.e. SEGMENTS of fixed size, for easier management.

PAGED POINTER: A POINTER indicating a region of PAGED MEMORY.

PHYSICAL ADDRESS: The identifier of location in main memory expressed as the number of that location relative to the absolute base of main memory.

POINTER: A data structure used to locate a SEGMENT of main memory or a particular word within a SEGMENT.

RAM (RANDOM ACCESS MEMORY): A hardware memory structure within which data words may be stored and subsequently retrieved. New word data can be written to replace older data.

RE-INDEXING: The action of updating an INDEXED POINTER by applying an INDEX VALUE. The result is an INDEXED POINTER referencing a data element corresponding to the sum of that INDEX VALUE and the ORIGINAL INDEX FIELD.

SEGMENT: A region of main memory. It may be contiguous or paged.

SEGMENT ASD CAM: One of the 3 CAMs of the ASDAM system, this 23-bit wide by 16-word deep CAM is used to store the ASD NUMBERS of various PAGE TABLES used in the ADDRESS TRANSLATION process.

TRANSLATION LOOKASIDE BUFFER (TLB): A combination of a CAM and RAM whereby the ADDRESS TRANSLATION process can often be achieved without accessing data in main memory.

UNINDEXED POINTER: A POINTER which references an entire region of main memory, rather than a single data element. This is the initial form of POINTERS before indexing and is identified by the INDEX BIT being set equal to zero.

UNPAGED POINTER: A POINTER which references a single contiguous region of main memory, rather than a VIRTUAL SEGMENT. This is identified by the PAGED BIT being set equal to zero.

UPDATE INDEX LOGIC: A portion of the ASDAM system responsible for combining the ORIGINAL INDEX FIELD and the INDEX VALUE during RE-INDEXING.

VIRTUAL SEGMENT: A region of main memory which is divided into a number of PAGES for easier management.

WORD INDEX: The number of the word referenced by an INDEXED POINTER relative to the base of the ACTUAL SEGMENT. It is stored within the POINTER as part of the INDEX FIELD.

SUMMARY OF THE INVENTION

The described pointer updating system for paged memory organization provides a local cache for holding logical data about paged-segments of data words which eliminates the need to fetch this data from main memory. Update index logic and insertion logic circuitry function to update the logical address of an original pointer to indicate the logical destination address of newly sought data from main memory. The system especially expedites the situation where the page (referenced by the new destination logical address) is different from the page referenced by the original pointer's logical address.

The following objectives are accomplished by the described Actual Segment Descriptor Associative Memory (ASDAM) system:

* To update pointers across page boundaries in the minimum number of machine cycles. This is three cycles when all data is present in the local cache.

* To retain, locally, all the information required to update frequently-used pointers across page boundaries.

* To minimize, in the event that all the required data is not present in the ASDAM system, the time required to fetch that data. In general, this is five machine cycles per missing item.

* To optimize performance and minimize microcode by handling all pointer updates in an efficient, consistent manner.

The Actual Segment Descriptor Associative Memory (ASDAM) system described herein enhances processor performance by reducing the number of machine cycles and memory accesses required to update a pointer from one page of a paged-segment of memory to another segment. The system operates by providing special purpose hardware functions and an arrangement of custom CAM and RAM structures to supply information about the paged-segment that would otherwise have to be fetched from memory. The ASDAM Control Logic monitors and directs all pointer updates required by the executing code and can interrupt processor execution to perform its own operations and to fetch and load data from memory. The pointer update across pages of paged-segments, given cache 'hits', is done in 3 machine cycles without any memory accesses.

The system includes three CAMs and three RAMs. These work concurrently to ensure that if the required data is missing, then the operation is continued with the minimum time lag. The system is specifically designed to enhance the performance of paged memory management schemes and deals with memory segments containing word or character data.

The ASDAM system achieves a significant performance efficiency over previous address translation cache systems which do not allow for the multiple steps required to update page pointers. In addition, the system greatly reduces the Mount of microcode traditionally used to accomplish this operation and significantly reduces the amount of memory traffic.

BRIEF DESCRIPTION OF THE DRAWINGS

FIG. 2.1 shows an example of a Page Table for a virtual segment.

FIGS. 2.2a and 2.2b show the structure of the ASD table in main memory, both in its actual form and in a symbolic representation showing how it associates its information with the ASD number. The segment length is in words.

FIG. 2.3 shows the structure of a character pointer as used by this system.

FIG. 2.4 shows the structure of a word pointer as used by this system.

FIG. 3.1 shows the ASDAM located within the associated processor and the relationship to main memory.

FIG. 3.2 shows the ASDAM CAMs and RAMs.

FIG. 3.3 shows an example of the contents of the ASDAM CAMs and RAMS.

FIG. 6A illustrates an example of the contents of the ASDAM CAMs and RAMs;

FIG. 6B illustrates and original pointer indicating a character in a page of a virtual segment;

FIG. 7A illustrates the contents of the ASDAM after re-indexing of a paged pointer;

FIG. 7B shows the updated pointer after reindexing of FIG. 7A;

FIG. 8 shows the updated pointer after the pointer of FIG. 7B has been re-indexed in the negative direction.

DESCRIPTION OF PREFERRED EMBODIMENT

Figure 1:
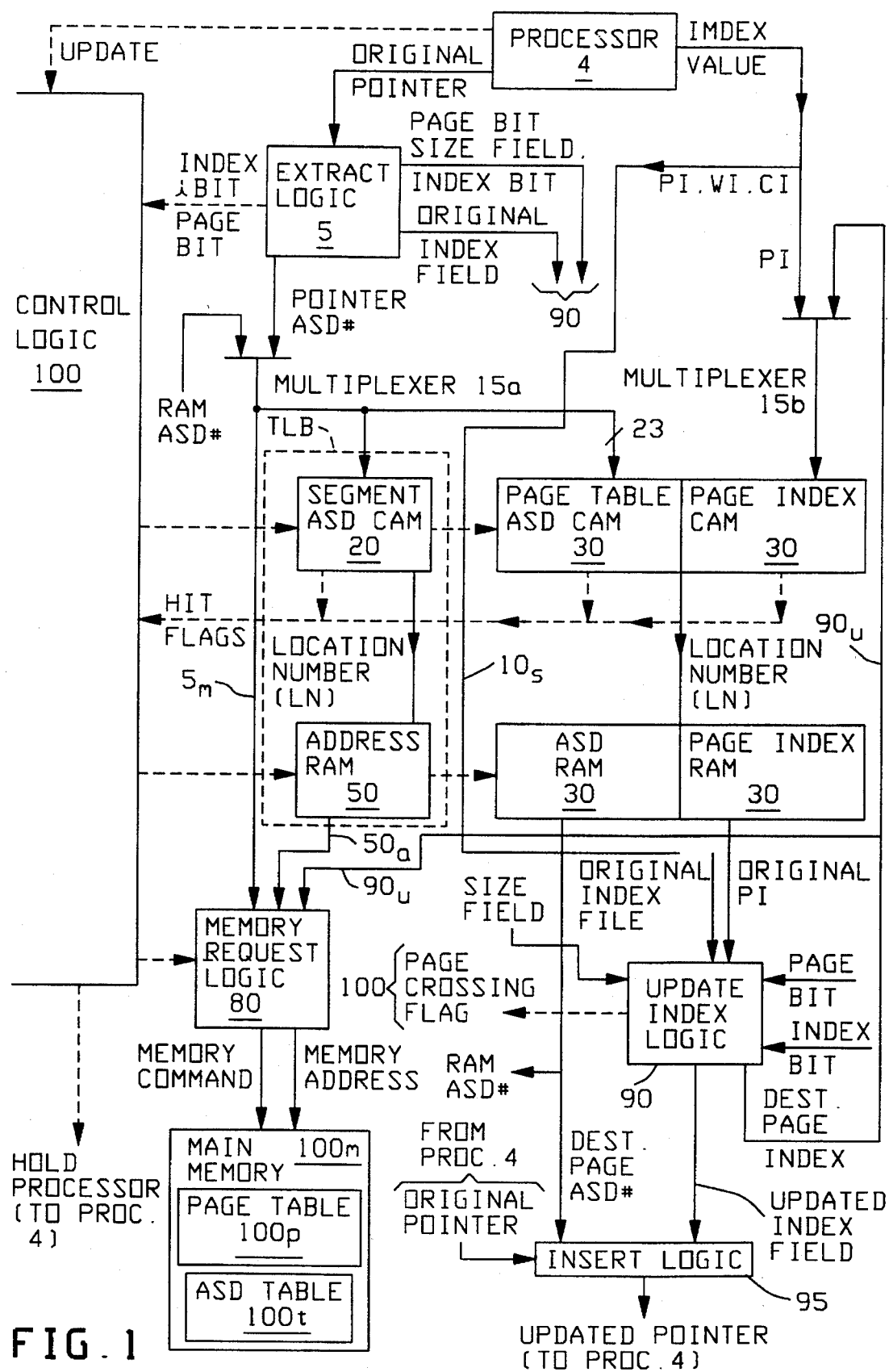
FIG. 1 is a block diagram of the overall structure of the Actual Segment Descriptor Associative Memory system.

The ASDAM system includes three CAMs and three RAMs, as shown in FIGS. 1 and 3.2. It has a Control Logic block (100) which monitors and directs all pointer updates required by the executing code and can interrupt processor execution to perform its own operations and to fetch and load data from memory into the ASDAM memory structures. In addition the ASDAM has several functional blocks which between them combine the input data with the data provided by the RAMs to perform the pointer update operation. These are the Extract Logic (5), the Memory Request Logic (80), the Update Index Logic (90) and the Insert Logic (95). The Control Logic (100) determines which outputs are required for the particular situation and selects them accordingly. The ASDAM system is shown in detail in FIG. 1.

The Segment ASD CAM (20) is associated with the Address RAM (50) in that the location number (LN) of a hit found in this CAM is used as an address to read from the RAM. The CAM has a valid bit associated with each location to indicate whether the Address RAM (50) contains the correct data at the corresponding location. The Segment ASD CAM (20) is 23 bits wide, which is the width of an ASD number, and the Address RAM is 32 bits wide, the width of a physical address to main memory. Both CAM and RAM are 16 locations deep. When the valid bit for a particular location is set, the CAM contains the ASD number of a page table and the RAM contains the physical address in memory of the base of that page table.

The Page Table ASD CAM (30) and the Page Index CAM (40) are associated with the ASDRAM (60) and the Page Index RAM (70) in that a hit found in one or both of these CAMs gives the location number used as a read address of the RAMs 60, 70. These 2 CAMs share a single valid bit for each location, indicating that the same locations in each CAM are always valid. A location in the Page Table ASD CAM (30) may contain either the ASD number of a single page of a virtual segment, or the ASD number of a page table. If it contains the ASD number of a page then the same location in the Page Index CAM (40) is unused. If it contains the ASD number of a page table then the same location in the Page Index CAM (40) contains a page index value.

If the valid bit of a location in Page CAMs (30 and 40) is set, then there is valid data in the corresponding locations of the ASD RAM (60) and the Page Index RAM (70). If the CAMs contain a page table ASD number and a page index, then the MDRAM (60) data is the ASD number of the page at that page index of that page table. In this case the location of the Page Index RAM (70) is unused. If the Page Table ASD CAM (30) contains the ASD number of a page, then the ASD RAM (60) and the Page Index RAM (70) contain the ASD number of the page table and the page index of that page, respectively.

The width of the Page Table ASDCAM (30) and ASD RAM (60) is 23 bits and the width of the Page Index CAM (40) and the Page Index RAM (70) is 12 bits, this being the maximum width of a page index. Each of these memories is 8 locations deep. The Segment ASD CAM 30 and Address RAM 50 are deeper than the other memory structures because they are also used as a conventional Translation Lookaside Buffer (TLB), as previously described, and have a greater requirement to store in-use data.

Each of the 6 memory structures in the ASDAM is a custom designed cell in CMOS technology. The operation is based on a 2 phase clock cycle. The CAM search is asynchronous, that is, when a searchkey is presented to the CAM, the output hit flag and location number (LN) outputs reflect the current contents after some fixed propagation time. The operation has no dependence on the edges of the clock. The CAM write operation however is performed during the second phase of the cycle when the clock is low. All inputs to the CAM must remain stable during this time. The CAMs also have a read mode whereby the contents of a location may be read out, as in a conventional RAM structure. The CAM read operation is also performed in the second phase of the cycle and during the first phase, all outputs are pre-charged high. This mode is not used in functional operation of the ASDAM and is not discussed further.

The RAM read operation is asynchronous to the clock, that is the reading of the RAMs begins as soon as the location number is available from the CAM and does not have to wait for any clock edge. Once again, the write operation is synchronized to the clock and is performed in the second phase of the cycle.

The Extract Logic (5) is used to decompose the original 52 bit pointer to its component fields. The ASD number is split into two fields within the pointer for historical reasons and the logic isolates the two parts and assembles them into a 23 bit ASD number. The index field, size field, page bit and index bit are also individually broken out from the pointer and distributed. The 20 bit index field from a word pointer is a word index. The same 20 bit field from a character pointer contains both a word index, in the 16 least significant bits, and a character index, in the 4 most significant bits. If the original pointer is unindexed, then the actual contents of this field of the pointer are ignored and all 20 bits of the original index field output of the Extract Logic are set to zero.

The index value is the number of characters, words and/or pages by which the pointer is to be updated. If the original pointer is unindexed, then this is the element within the data segment that will be referenced. If the pointer is indexed already, then this value is added on to the original index field to move the pointer up or down the data segment by this number of elements. Thus the page index may either be the page index of the destination page, as in the first case, or simply the number of whole pages by which the pointer will be moved, as in the second.

The multiplexers (15a and 15b) are 2-to-1 multiplexers of width 23 bits and 12 bits respectively. The function of these is to select one of the two data inputs to appear at the output, according to the select input. They are controlled by the Control logic (100) and select the source of the search keys used to search the ASDAM CAMs. They are always both set to select the page index from the index value and the original pointer ASD number unless a page crossing is detected in the reindexing of a paged pointer. In this case, they are both changed to select the RAM ASD number in RAM 60 and the destination page index for the second CAM search only.

In re-indexing, the index field is extracted from the pointer and added to the index value. This operation is performed by the Update Index Logic (90). The logic 90 receives the index value and the original index field, page bit, index bit and size field from the Extract Logic (5). It also receives an input from the page Index RAM (70) which at times carries the original page index. If the size field indicates a character pointer, the original and index value character indices are added together, modulo six or twelve for 8-bit or 4-bit data. The sum forms the destination character index and the carry-out is used as the carry-in when adding the word indices.

The original word index is added to the index field word and page indices to form a destination word index and incremental page index. The incremental page index shows how many pages away from the original page the destination page is. If the original pointer is paged and indexed, the destination page index is formed by adding the original page index to the incremental page index. Otherwise, the destination page index is set to be the same as the incremental page index.

An indication of whether a page boundary has been "crossed" during a re-index is sent to the Control Logic. This 'page crossing flag' is generated if the incremental page index is non-zero and the original pointer is paged and indexed. The Update Index Logic (90) also generates the destination index field, consisting of a character index (CI), if the data is in characters, and a word index (WI). The logic concatenates a 20-bit field from these components according to the size field and paged bit which may be merged back into the pointer by the Insert Logic (95).

A CAM 'hit' is defined as an exact match of the searchkey with the data in one of the CAM locations whose valid bit is set. A match on data whose valid bit is "not set" is of no value and is not reported. If there are misses in the ASDAM, data may have to be fetched from memory 100M using an address generated by the Memory Request Logic (80). Depending on the data required, this address may be of the ASD1 or ASD3 word of a given ASD number or of a page ASD number at some location in a page table. The address of an ASD1 word is found by shifting the data left by 2 bits, i.e. multiplying by 4. The address of an ASD3 word is found by shifting left 2 bits and setting the next to least significant bit, i.e. by multiplying by 4 and adding 2. It will be seen from the structure of the ASD Table in memory described previously that this procedure translates any ASD number into the address in memory of its corresponding ASD1 and ASD 3 words.

Whether a memory request is generated and which address is used is governed by the Control Logic (100). All 3 addresses are generated (by Logic 80) in parallel every machine cycle, so that if a memory request is required, the address and fetch command may be issued without delay. The outputs of this block are the memory command requesting the fetch of a word of data and the physical address in memory of the data to be returned.

The Control Logic (100) contains two counters, one for the segment ASD CAM (20) and Address RAM (50) and one for the other 4 memory structures. These are used to supply write addresses to the CAMs and RAMs. Whenever a write operation to the ASDAM is complete, the relevant counter is incremented. The counter supplying addresses to the 16 location structures counts from 0 to 15, then returns to zero and begins again. The other counter, supplying addresses to the 8 location structures cycles counts from 0 to 7.

The depth of the memory structures has been chosen as an optimal compromise between performance, access speed and physical size. The larger the memories, the greater the probability of a hit on a given search. However larger structures also take up critical area on the VLSI die and have slower access times. During normal processor operation, the slots are quickly filled and thereafter, when a new slot is required, a slot which already contains valid data must be overwritten. This is done with the address counters described above in a cyclic 'round-robin' manner by which each slot is overwritten in turn. This simple replacement scheme has been shown by modelling to be as efficient for this application as more sophisticated algorithms.

It will be seen that the CAMs and RAMs of the ASDAM system exist to provide the ASD number of the destination page without accessing main memory. The ASDAM provides the ASD number of the actual segment which the updated pointer must reference and an updated index field consisting of the word index of the word within the actual segment at which it points, relative to the base, and, if character data, the character index of the character within this word which is being specified. These values are merged directly back into the pointer by the Insert Logic 95, overwriting the values that were previously there. The update operation is then complete and the result is stored back into a processor register.

FUNCTIONAL OPERATION

When a pointer update is detected by the processor, the pointer and the index value are presented to the ASDAM from registers in the processor. The pointer is presented to the Extract Logic (5) which brake the pointer into its component parts and sends the page and index bits to the Control logic (100), the original index field size field, page bit and index bit to the Update Index Logic (90) and the Page Table ASD number to the 2 ASD CAMs (20 and 30), via a multiplexer (15a).

The index value, consisting of the word index, page index and character index, is passed to the Update Index Logic (90). The index value page index is also passed to the Page Index CAM (40) via a multiplexer (15b). If the segment is unpaged, this is not a valid page index which is used to search the Page Index CAM (40). However, since the Control Logic (100) ignores all hit flags when indexing unpaged pointers, there is no problem in finding false matches.

At this point, the multiplexers are always set to select the ASD number and the page index from the pointer and index value presented to the ASDAM inputs. The original pointer ASD number is used to search the ASD CAMs (20 and 30) and the index value page index is used to search the Page Index CAM (40). The hit flags from all 3 CAMs are provided to the Control Logic (100). These same searches are performed whatever type of pointer update is required, with the results being interpreted differently by the Control Logic.

At the same time as the search is taking place, the Update Index Logic 90 adds the index value to the index field from the original pointer to form a destination word index, character index and incremental page index. If the index bit indicates that the original pointer is unindexed, the original index field passed by the Extract Logic (5) is set to zero. The incremental page index shows how many pages from the original page the final page is. The incremental page index is added to the original page index (provided by the page Index RAM 70) to form a destination page index. If the original pointer is unindexed, then the incremental page index is the destination page index. If the incremental page index is non-zero and the original pointer is paged and indexed, then a page crossing flag is sent to the Control Logic (100) indicating that a page crossing has taken place. An updated index field is generated containing the updated character index, if the size field indicates characters, and the updated word index. The cycles in which the updated indices are valid depend on the type of update operation and the hits found in the CAMs. The Control Logic determines which results are valid as described below.

The Control Logic (100) must first of all determine whether the microcode is attempting to perform a pointer update. An input is received from the microinstruction currently being executed as to whether this is the case. If no pointer update is required in the current machine cycle, the ASDAM system as described here is not required and performs no function. However, if an update is required then it is the Control Logic (100) which controls the flow of data through the ASDAM and fetches and loads into the ASDAM any missing data.

The Control Logic (100) receives the 3 CAM (20, 30, 40) hit flags plus the page bit and the index bit of the original pointer and the page crossing flag from the Update Index Logic (90). The Control Logic determines whether the ASD number in the pointer must be updated and, if so, whether the new ASD number is present in the ASDAM. If the original pointer is unpaged, then no change of the ASD number is required and the index operation completes by merging the updated index field from the output of the Update Index Logic (90) into the pointer using the insert Logic (95). If the original pointer was unindexed then the index bit is also set at this time. The finished pointer is written away into a processor register and the machine continues execution with the next operation.

If the Control Logic finds that the page bit of the original pointer is set, then unless the pointer is indexed and the page crossing flag from the Update Index Logic (90) is not set, it must check to see that the required information to complete the update is present in the ASDAM. In the case mentioned, the ASD number in the pointer is that of the page where the word referenced by the original pointer resides. If the destination word is in the same page, then no change to the ASD number in the pointer will be necessary.

For an index of a paged pointer, the ASD number in the pointer, i.e. that of the page table, must be replaced with the ASD number of the destination page. From the original pointer and the page index of the index value, the ASD number of the page table and the destination page index are available and between them they uniquely identify the destination page. If there is a hit in the Page Table ASD CAM (30) this indicates that the page table ASD, extracted from the original pointer, is present in a valid location of this CAM. In fact, if several pages of the same segment have been already accessed, there may be several valid locations in the CAM each with this same page table ASD number in, but each with a different page index in the corresponding location of the Page Index CAM (40).

When the index field page index (PI) is used to search the Page Index CAM 40 in conjunction with the search of the Page Table ASD CAM 30, a valid hit on the same location in both CAMs indicates that the ASD number of the page corresponding with the page index and page table ASD number is present in the ASDRAM (60) at the location given by the location of the hit. If two hits are found, both in the same location, then all the information needed to complete the index is present in the ASDAM and the Control Logic allows the one cycle pointer update to proceed. The location number of the CAM hits is presented to the ASD RAM 60 which in turn supplies the ASD number of the destination page. The Update Index Logic 90 supplies the updated index field. Both of these are merged into the original pointer, overwriting the previous contents of these fields, and the completed pointer is stored away into a register in the processor.

At the same time as the search is being performed on the Page CAMs (30 and 40), the same ASD number is being used to search the Segment ASDCAM (20). If there is a hit here, the indication is that the address of the base of the segment corresponding to this ASD number is present in the Address RAM (50). Since this is a page table ASD number located in CAM 20, the actual segment which it identifies is a page table. From the structure of page tables, it is known that the ASD number of each page of the virtual segment resides at an offset from the base equal to its page index. If there is a hit in this CAM then the location number of the hit is presented to the Address RAM 50 which in turn provides to the Memory Request Logic (80) the base address of the page table. By adding onto this via line $90_a$ the destination page index available from the Update Index Logic (90), the Memory Request Logic (80) forms the address of the location in memory which contains the ASD number of the destination page.

Thus, assuming a hit in the Segment ASD CAM (20), the ASDAM is simultaneously searching its CAMs for data while generating the address in memory of that same data. Moreover, the Memory Request Logic (80) simultaneously translates the ASD number being used to search the ASD-CAMs into the address in memory of the location containing the base address of the corresponding actual segment. Again, while searching a CAM, the ASDAM is preparing for a miss by forming the address in memory of the data it is searching for.

The hit information from all 3 CAMs is sent to the Control Logic (100) which takes the appropriate action. If there is not a hit in both Page CAMs (30 and 40) but a hit in the Segment ASD CAM (20), a memory read request is initiated for the missing ASD number with the address given by the addition of the page table base address, supplied by the Address RAM (50), and the destination page index. If there is no hit in either the Page CAMs or the Segment ASD CAM, then a read request is issued with the address of the ASD1 word of the ASD number.

When the Control Logic detects that a required data item is missing, it must halt the execution of instructions in the processor while the data is fetched and the CAMs and RAMs are updated. The processor has a mechanism used for interrupting the execution of an operator and invoking a specific microcode routine, after which the original operator is re-started. The mechanism is initiated by certain hardware-detected conditions and the microcode routine invoked is dependent on the particular situation. The ASDAM uses this mechanism to interrupt the flow of microcode and fill the ASDAM with the required data and then restart the operator at the place where the missing data was detected. This is achieved by putting the current micro-instruction address on the processor subroutine stack and loading a new microinstruction address into the processor sequencing control. The microcode continues to execute from this new location until it completes its function, when the original micro-instruction address is retrieved from the subroutine stack and execution continues from that point. Two short microcode routines may be invoked by the ASDAM Control Logic. The 'Segment Fill' routine is used to load the Segment ASDCAM and Address RAM and the 'Page Fill' routine to load the remaining CAMs 30, 40 and RAMs 60, 70. Both routines require two machine cycles plus a single memory read.

If the index of a paged pointer is in progress and a hit is not found in the Page CAMs (30 and 40) but there is a hit in the Segment ASD CAM (20), then the Control Logic (100) initiates a memory read using the address of the destination page ASD number and invokes the Page Fill routine. When the load is complete, the operator is restarted and the required hit is found. The pointer update is completed. If a hit is not found in the Page CAMs or in the Segment ASD CAM, then the Control Logic initiates a memory read using the address of the ASD1 word of the Page Table and the Segment Fill routine is invoked. When the Segment Fill routine is complete, the operator is restarted. Inevitably this time there is a hit in the Segment ASD CAM and no hit in the Page CAMs. Now a memory request for the destination page ASD number is initiated and the Page Fill routine is invoked. Calling the two routines in serial is slightly less efficient than invoking a routine which performs both loads, but the case requiring it is rare and dealing with it in this way is consistent and allows simplification of hardware, microcode and Control Logic.

The Segment Fill routine writes the missing ASD number into a location in the Segment ASD CAM given by the current value of the 16-location address counter in the Control Logic. The processor then waits until the memory returns the requested base address data which is written into the Address RAM 50, at the location given by the unchanged 16-location address counter. At the same time, the valid bit for this location in the CAM is set and the 16-location address counter is incremented, so next time a load is done, the adjacent location is written. The update is now complete and next time a search is performed on this same ASD number, a hit will be returned.

The Page fill routine writes the Page Table ASD number and the page index used for the searches simultaneously into a location of the Page Table ASD CAM (30) and Page Index CAM (40) respectively. This location is given by the 8-location address counter in the Control Logic (100). When the requested data word returns from memory, it is divided into two parts, one being written into the ASD RAM and the other into the Page Index RAM. The location is again given by the 8-location address counter. In the case previously discussed, i.e. the indexing of paged pointers, the requested data was an ASD Number and the part loaded into the Page index RAM (70) is of no significance. However, it will be seen later that during a re-index, this same load routine is invoked in a different situation. This time the returning data is an ASD3 word and both parts are required. As the data is loaded into the two RAMs 60, 70, the valid bit of the corresponding location in the CAMs is set and the 8-location address counter in the Control Logic is incremented.

If the required data is present in the ASDAM, the indexing of any pointer may be achieved as described above in a single machine cycle. It may be noted that there are two portions of the ASDAM which serve separate functions: the right hand portion consisting of CAMs 30, 40, and RAMs 60, 70 which operate when "hits" occur in order to provide information to the processor 4 to generate an updated pointer. On the other hand, the left hand side (FIG. 1) of the system consisting of CAM 20 and RAM 50 operate when "no hits" occur (in CAMs 30, 40 and RAMs 60, 70) so that a rapid operation can occur to fetch the required data from main memory 100M. Each load routine required usually adds 5 machine cycles to the operation.

The ASDAM Control Logic 100 may detect that a pointer re-index is not required and that the "page crossing flag" from the Update Index Logic 90 is not set. Thus, no page crossing is required. In this case the ASD number in the original pointer does not need to be changed. The index value is added to the original index field. This is merged back into the pointer index field by the insert Logic 95 and the result written away into a processor register.

However, the ASDAM Control Logic 100 may detect that a pointer re-index is required and that the page crossing flag from the Update Index Logic 90 is set. In this case, the destination word is in a different page to the original word earlier referenced by the original pointer. Hence the ASD number in the pointer, i.e. that of the original page, must be changed to that of the destination page. The task of the ASDAM is to provide this ASD number.

This form of update requires two serial searches of the ASDAM CAMs. The first search uses the page ASD number from the original pointer and requires a hit in the Page Table ASD DAM (30). After a hit is achieved in the Page ASD CAM, the Control Logic asserts a 2 cycle hold on the whole processor except the ASDAM, which uses the time to search the Page Table ASDCAM 30 and the Page Index CAM 40 using search keys provided by the ASD and Page Index RAM outputs. From this point on, the requirements for hits are identical to the updating of unindexed paged pointers.

The ASD number of the destination page lies within the page table at an offset from the base equal to its page index. The process of obtaining this ASD number begins with identifying the ASD number of its page table and the original pointer's page index. Neither of these is contained within the pointer but must be found by fetching from memory the ASD3 word of the original page ASD number. The page table ASD number can be translated into the address of its ASD1 word which can be fetched to supply the base address of the page table. The page index of the destination page is found by adding the incremental page index to the page index of the original page. To this can be added the base address of the page table and the address in memory of the destination page when the destination page ASD number is finally available. It is by providing the page table ASD number and original page index from a page ASD number, calculating the destination page index and then providing, from these two items, the destination page ASD number that the ASDAM system expedites this process.

In this case of re-indexing with a page crossing, the Control Logic interprets the results of the ASDAM searches differently. The ASD number, extracted from the original pointer and used to search the ASD CAMs, is that of the original page. In this case, a hit will not be found in the Segment ASD CAM as, for the present purpose, it contains only page table ASD numbers. The hit flag from this CAM is ignored. The Page Index CAM 40 is searched with the index value page index, which in the present case of reindexing is not a valid page index. The hit flag from this CAM is therefore also ignored by the Control Logic. The hit flag that is of interest is the Page Table ASD CAM 30. A hit on a particular location of this CAM indicates that the corresponding location of the ASD RAM 60 and the Page Index RAM 70 contain respectively the ASD number of the page table and the page index of the original page. In the event of a hit, the location number is passed to the two RAMs (60 and 70) and the data resident at that location is supplied by them.

If no hit is found in the Page Table ASD CAM 30 in this situation, then the Page Fill routine is invoked by the Control Logic. This is the same routine as previously used to load the two Page CAMs (30 and 40) and the ASD and Page Index RAMs (60 and 70). This time the Control Logic 100 selects the address of the ASD3 word generated from the ASD number of the original page to accompany the memory request. While the processor is waiting for the ASD3 word to return from memory, the Control Logic writes the page ASD number into the next available location of the Page Table ASD CAM 30. When the data returns, it is split into its two component parts and the page table ASD number stored in the same location of the ASD RAM 60, and the original page index stored in the Page Index RAM 70. The pointer update is then restated and this time finds a hit in the Page Table ASD CAM 30.

The Control Logic 100, on receiving the Page Table ASD CAM hit flag and the page crossing flag, stops execution in the processor for 2 machine cycles while the remainder of the pointer update is accomplished. The Control Logic switches the multiplexer (15a and 15b) select inputs to choose the CAM search keys to be the page table ASD number from the output of the ASD RAM 60 and the destination page index from the Update Index Logic 90. A second search is then performed on the CAMs. From this point on, the operation and the data required is the same as the unindexed paged case described above.

If a hit is found on the same location of both the Page CAMs (30 and 40) then the ASD number of the destination page is present in the ASD RAM 60. If it is not present but the page table ASD number is present in the Segment ASD CAM, then the destination page ASD number may be fetched directly from memory. If there is no hit in the Segment ASD CAM 20 either, then the base address of the page table must first be fetched and then subsequently the ASD number of the destination page.

The exact same 2 microcode fill routines are used to load the CAMs and RAMs. However, in this case, when the update is restarted, the first search must always be performed to provide the page table ASD number and destination page index for the second search. Thus the 2 cycle hold may be invoked up to 3 times if all data has to be retrieved from memory.

Once the destination page ASD number is available, it is taken along with the updated index field and merged back into the pointer, overwriting the existing ASD number and index field, to form an updated pointer. This is written back into a processor register and the operation is complete. The data written into the ASDAM memories during the course of an index operation may be used in subsequent updates of pointers to the same page or different pages of the same segment. Locations remain valid until the location counters wrap around and overwrite them in turn with other data. No data is ever written into the ASDAM unless it has been searched for immediately prior. This guarantees that the same data is never found in two different locations.

There are certain times during processor operation when the ASD table in memory is modified by the Operating System. As with any cache, it must be guaranteed that the data in the cache accurately reflects the actual data stored in memory. Coherency must be maintained and since the ASD table is changed very infrequently, this is achieved by simply purging the ASDAM, whenever it takes place. The Control Logic receives a flag from the processor indicating that a change is being made to the ASD table. The Control Logic then resets all the CAM valid bits to zero simultaneously. The next searches for any given ASD number or page index will therefore always result in misses and the correct data will be fetched from the updated ASD table.

OPERATIONS: Certain specific examples of the use of the ASDAM system will be forthcoming to illustrate the functional operation.

EXAMPLE: RE-INDEXING AN UNPAGED POINTER (P=0)

Figure 4A:
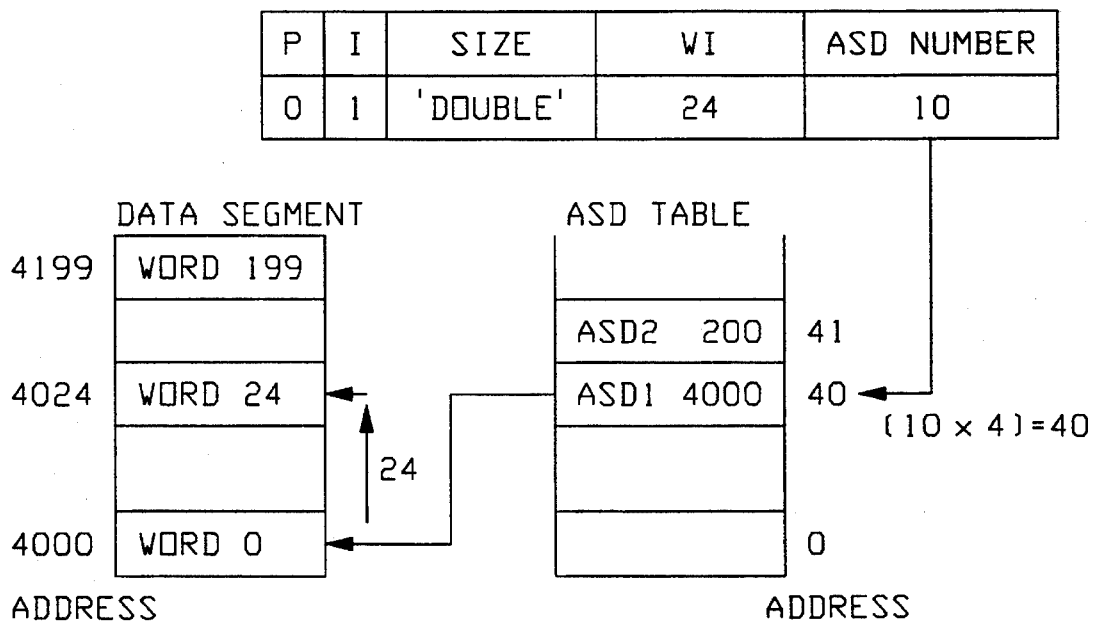
FIG. 4A illustrates an original pointer indicating a double precision word in a segment of unpaged memory.
Figure 4B:
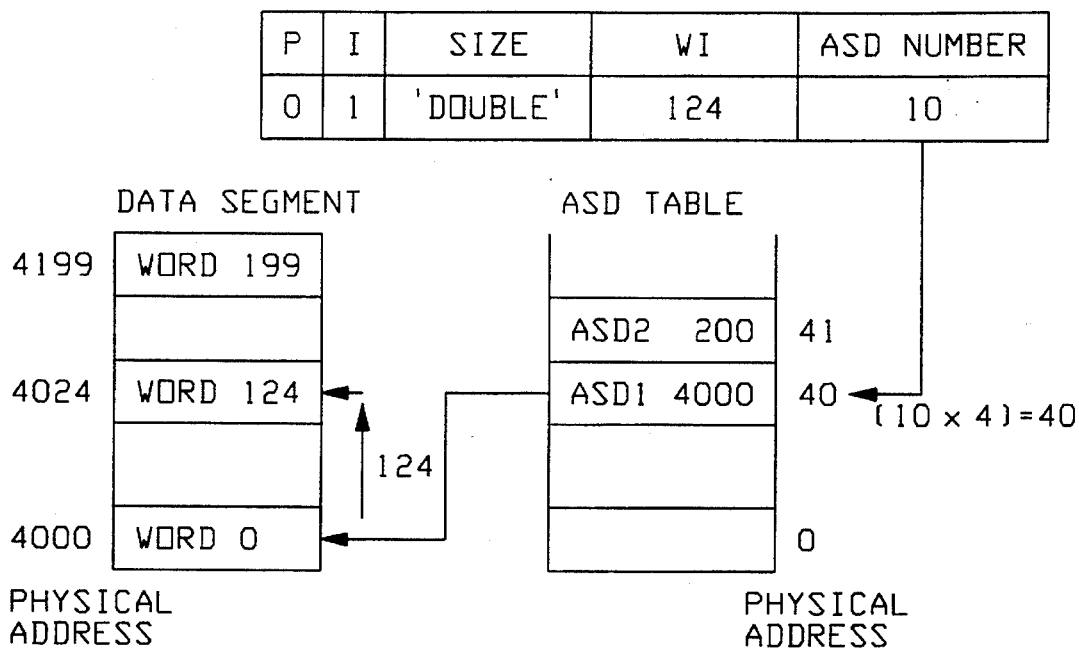
FIG. 4B illustrates an the same pointer that is updated with a Word Index=124.

Consider re-indexing the unpaged double precision word pointer shown in FIG. 4A by a word index value of 100. The pointer must be therefore be moved up the data segment by 100 words. The original word index, 24, is added to the word index to give a destination word index of 124. The ASD number contained within the pointer is that of the actual segment and does not change. The word index of the original pointer is overwritten with the destination word index, and the completed pointer is shown in FIG. 4B.

EXAMPLE: RE-INDEXING A PAGED POINTER (P=1) CROSS A PAGE BOUNDARY WITHOUT THE ASDAM SYSTEM

Figure 5A:
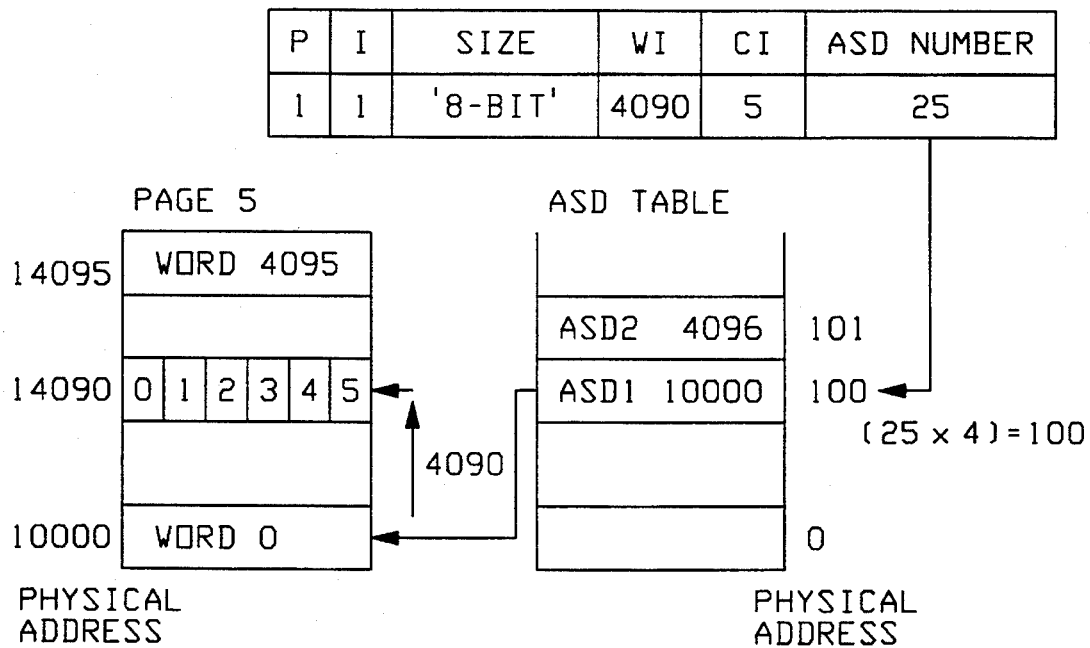
FIG. 5A illustrates pointer that is paged and indexed to reference a character in a page of a virtual segment.

Consider indexing the "8-bit character pointer" in FIG. 5A by the value of 50. This would be converted to a character increment of 2 and a word increment of 8. The existing pointer is assumed to be presently pointing to character 5 of word 4090 of page 5 of a 15 page virtual segment. The addition of the character increment of 2 to the present character index of 5 results in a new character index of 1 with a carry of 1 into the word index. This occurs because character incrementing is a modulo 6 operation the addition of the word increment of 8, the character carry of 1 and the present word index value of 4090 results in a new word index of 3 because word increment is a modulo "page size" operation. For this implementation the page size is equal to 4096 words. The result of the operation did produce a carry of 1 from the present word index specifying that the pointer moved into the next page. For other examples this value could be greater than 1 indicating a number of pages skipped. For this example, this results in a virtual pointer that is pointing to the proper next word and character, and the next page.

Figure 5B:
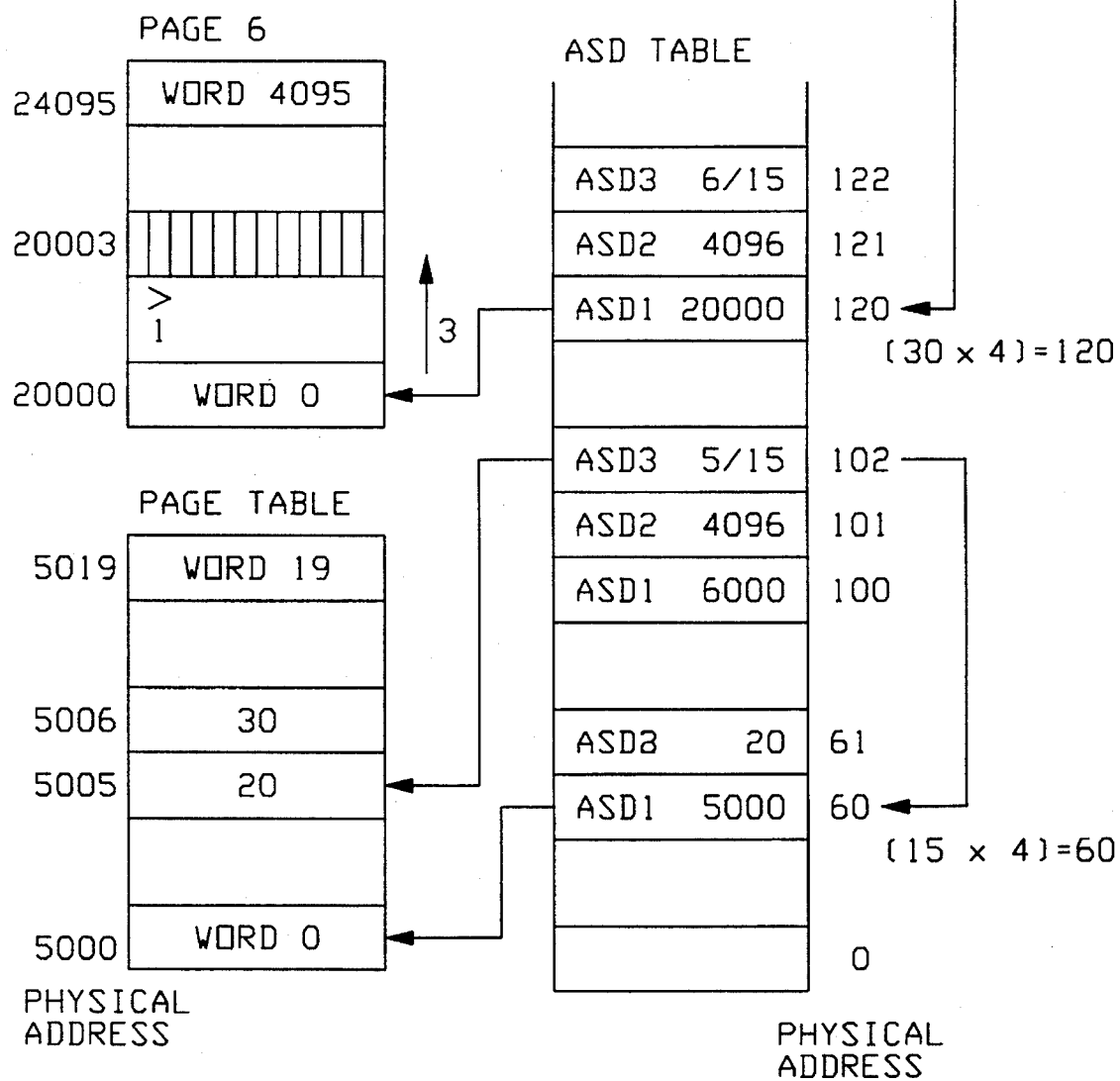
FIG. 5B illustrates the same pointer updated into the adjacent page of the segment and also the Page Table.

In this example, it is assumed that the page 5 ASD was located in the 25th position of the ASD Table and that the page 6 ASD is located in the 30 of the ASD Table. FIG. 5b shows the result of obtaining the page 6 ASD position value in the ASD Table (position 30) and placing this value in the updated pointer. This updated pointer also includes the updated word index of 3 and the updated character index of 1. The details of how this transformation occurs follows.

Updating an indexed pointer to reference a word or character in a different page involves a "page crossing". Accomplishing the crossing is achieved in two parts; firstly, identifying the page table and the original page index, and then forming the destination page index and locating the ASD number of the destination page.

The ASD number of the page from the original pointer, 25, FIG. 5a, is translated into the address of the ASD3 word associated with that page. The ASD3 word of an ASD pointing to a page contains information about that page and it's relationship to the Virtual Segments' Page Table. specifically the Page Index, which is the offset from the bottom of the Page Table containing the pointer pointing to this page, and the ASD number pointing to the Page Table ASD located in the ASD Table, is located in this ASD3 word. Referring to FIG. 5b, this is address (25×4)+2=102 in memory where 25×4 is the location of the page 5 ASD1 word in the ASD Table and the 2 is the ASD3 offset within that ASD.

Updating an indexed pointer to reference a word or character in a different page involves a "page crossing". Accomplishing it achieved in two parts: firstly, identifying the page table and the original page index, and then forming the destination page index and locating the ASD number of the destination page.

The ASD number from the original pointer, 25, FIG. 5A, is translated into the address of the ASD3 word associated with that page. Referring to FIG. 5B this is address 25×4+2=102 in memory. A read request is issued by the processor for this ASD3 word which yields the original page index, 5, and the ASD number of the page table, 15. The page table ASD number is translated into the address of its ASD1 word, 15×4=60, and a second memory read request is issued to return its contents. The returned ASD1 word yields the physical address of the page table as 5000, (FIG. 5B).

The original page index, from the present page's ASD3 word, is added to the incremental page index (1 that was the carry from the modolo 4096 addition to the original word index) to form the destination page index, 6. The value of "6" is therefore added to the 5000 to produce the memory address, 5006, of the pointer for the next page to access. The ASD number 30 (of the destination page) therefore resides at a displacement of 6 from the base of the page table, i.e. at address 5006. A third read request is then issued to fetch the page 6 pointer from this location (5006) in memory. Upon its return, the ASD number 30 is inserted into the virtual pointer (FIG. 5B) along with the updated word (WI) and character indices (CI), and the result is stored away into a processor register. The indexed pointer is shown in FIG. 5B. The virtual pointer can now be used to access the logically next—desired word.

EXAMPLE: RE-INDEXING PAGED POINTERS WITH THE ASDAM: —

Consider re-indexing the original pointer shown in FIG. 6B. The ASDAM CAM and RAM contents are as shown in FIG. 6A. The Control Logic (100) detects a pointer update required by the operator of the program currently executing and that the pointer refers to 4-bit character data from its size field, provided by the Extract Logic (5). The index value provided by the processor has a value of 196,706 which resolves to a page index of 4, a word index of 8, and a character index of 2, by which the pointer is to be updated.

The pointer (FIG. 6B) currently references the 4th character in the 2nd word of the page having ASD No. 90. The pointer is to be moved through the data segment by 196,706 four-bit index value characters, i.e. by 4 pages, 8 words (equivalent to 96 characters) and 2 characters. Adding the indexing value to the original index field in the original pointer, it is seen that the indexed pointer will reference character 6 of word 10 of the page with page index equal to the original page index plus 4 which equals page.

As with every index operation, the original pointer and the index value are presented to the ASDAM system. The ASD number, 90, (FIG. 6B) is extracted from the pointer and presented to the ASD CAMs (20 and 30) and the page index, "4", FIG. 6A is presented to the Page Index CAM (40). The Control Logic (100) meanwhile detects that the index in progress is on a paged indexed pointer (and there is no hit in the segment ASDCAM 20 or the Page Table ASD CAM 30). It therefore ignores the results of the search in the Page Index CAM 40 and the Segment ASD CAM 20. As these searches are taking place, the Update Index Logic 90 adds the Word and Character indices together to form a destination character index of 6 (4+2) MOD 12=6, a destination word index of 10 (2+8=10) and an incremental page index of 4 (196,706/12MOD4096). The page crossing flag is set because the incremental page index is non-zero.

The page crossing flag indicates to the Control Logic that the index cannot be completed by simply inserting the new index field into the pointer: a new ASD number must also be provided. For this, the Control Logic looks for a hit in the Page Table ASD CAM 30, indicating that the ASD number of the page table and the original page index are present in the ASD 60 and Page Index 70 RAMs. However, with the ASDAM contents of FIG. 6A, there is no hit in the CAM 30. The Control Logic therefore selects the address of the ASD3 word, 362, (4×90)+2=offset of ASD3 word translated by the Memory Request Logic 80 from the original page ASD number, and issues a memory read request for this data. The Page Fill routine is then invoked by the Control Logic. This writes the ASD number 90 into location 5, FIG. 7A, of the Page Table ASD CAM 30. When the data returns from memory, it puts the page table ASD number, 15, in location 5 of the ASDRAM (60), FIG. 6A, and the original page index, "2", FIG. 6A, in the same location of the Page Index RAM. The location is then marked valid and the 8-location address counter incremented. Once this is complete, the operation is restarted.

This time a hit is found in the Page Table ASD CAM (40). The location of the hit is passed to the ASD RAM and Page Index RAM, which provide at their outputs the page table ASD number and the original page index. The Control logic, on receiving the hit flag and the page crossing flag, invokes a hold on the processor for 6 machine cycles. During this hold the Update Index Logic adds the original page index, 2, to the incremental page index, 4 from the re-index value, to form the destination page index of 6 and this is used to search the Page Index CAM. At the same time the page table ASD number, 15, is used to search the ASD CAMs 20, 30. The Control Logic selects these search keys for the CAM with the multiplexers $15_a$, $15_b$. There is no hit found on the same location of both the Page Table ASD CAM and the Page Index CAM, but there is a hit found at location 2 (15), FIG. 6A, in the Segment ASD CAM 20. This indicates that at the end of the hold, the ASDAM is not in a position to complete the index, but it can directly form the address of the data required, i.e. the base of the Page Table.

The base address (5000) of the page table is provided by the address RAM 50, FIG. 7A, from the location of the hit in the segment RAM. This is added to the destination page index by the Memory Request Logic (80), thus forming the physical address, 5006, of the location of the page table which contains the ASD number of the destination page. A memory read request is initiated to fetch this data and the Page Fill routine is invoked for a second time. The destination page index and the page table ASD number are written into the next available location, 6, of the Page CAMs (30, 40). The ASD number 30, when it arrives from memory, is stored at the same location of the ASD RAM 60. The location, 6, is marked valid and the 8-location address counter is incremented. The operation is then restarted.

Once again the inputs are presented to the ASDAM and the CAM searches performed. A hit is found on ASD number 90 on location 5, FIG. 7A, of the Page Table ASD CAM 30 and the page table ASD number "15" and the original page index "2" are provided from the associated RAMs 60, 70. A two machine cycle hold occurs, during which the destination page index (2+4=6), formed by the Update Index Logic, and the page table ASD number are used to search the CAMs. This time a hit is found on location 6, FIG. 7A, of both the Page Table ASD CAM 30, FIG. 7A and the Page Index CAM 40 and the ASD number, 30, of the destination page is provided by the ASD RAM 60. This, together with the updated index field, is merged into the pointer by the Insert Logic (95). It is then stored away. The page crossing index is finally complete. The final ASDAM contents and the updated pointer are shown in FIGS. 7A and 7B.

EXAMPLE: RE-INDEXING PAGE POINTERS WITH THE ASDAM

In a situation of re-indexing the pointer shown in FIG. 7B by a reverse indexing operation using a value of (−4207) which resolves to an index value of −1 page, 110 words and −1 character. The negative index value indicates that the destination element referenced by the pointer is nearer to the beginning of the data segment than the original element. The contents of the ASDAM are assumed to be as shown in FIG. 7A.

The Control Logic notices that it is a re-index of a paged pointer and therefore checks the page crossing flag. The Update Index Logic 90 adds the index value and the original indices together to form the incremental page index of −2, and the destination word index of 3996 (FIG. 8) and character index of 5 (FIG. 8). The page crossing flag is set. Next, the Control Logic checks the hit flag from the Page Table ASDCAM 30 to see if the ASD number of the page table and the original page index are present in the RAMs 60, 70. A hit on ASD number 30 is found in location number 2 (FIG. 7A).

The Update Index Logic 90 now forms the destination page index of 4 by adding the incremental page index −2, to the original page index of 6. Thus 4=6− 2. This is routed along with the ASD number of the page table, i.e. 15 from the original page index of 6. This is routed along with the ASD number of the page table, 15, via the multiplexers, to search the CAMs 30, 40 while the processor is held for 2 machine cycles. In this search, there is a hit in both the Page Table ASDCAM (30) and the Page Index CAM (40) at location 0, FIG. 7A. The same location in the ASD RAM 60 provides the ASD number "40", (FIGS. 7A and 8) of the destination page. This is merged into the pointer along with the updated index field by the Insert Logic 95.

The re-index operation has then been completed in 3 machine cycles. No memory operations have been required and the ASDAM CAM and RAM contents are unchanged. The resulting pointer is shown in FIG. 8.

Described herein has been an associative memory system wherein cache CAMs and RAMs can be effective in rapidly updating pointers in paged memory systems and especially in re-indexing an indexed pointer across paged boundaries.

While the preferred embodiment has been delineated herein, it should be understood that other variations may be encompassed by the invention as defined in the following claims.

What is claimed is:

1. In a computer system having a processor utilizing an original pointer, said pointer being unindexed or indexed, which provides fields for a page bit, an index bit, size of data sought, a word index, and/or character index and an original logical address of a data word/character said original logical address pointing to a page table containing logical addresses of pages if unindexed or the original logical address of a page if indexed, said system including a main memory means having segments organized into pages, each having M words said M words stored in pages located in defined segments and wherein said main memory means contains tables of logical addresses of pages and a table of logical addresses of segments, a system for updating the logical address of said original pointer, comprising:

(a) processor means for establishing an index value for new destination data (word, character) and the logical address of a new destination page for either the unindexed original pointer or the indexed original pointer, both methods utilizing a derived original page index value which represents an offset to a location in the specific page table that contains the logical address of the new destination page;

(b) cache means for storing frequently used logical addresses of pages and of page tables to be searched and for storing page index values;

(c) means to search said cache means to derive the logical address of said new destination page, for the case of the original indexed pointer, by means of deriving the logical address of the original page by using the original page index value combined with an incremental page index derived from the index value for the new destination data (word, character), and thereby the logical address of the page table entry of the segment containing the logical page address of said new destination page, or for the case of the original unindexed pointer, by means of deriving the logical page address of the destination page entrain the page table pointed to by the logical address of the page table provided by the original pointer combined with a page index derived from the index value for the new destination data (word, character);

(d) means to update the said original pointer's word and/or character index value with a new index value from said processor to provide an updated index value for said new destination data (word, character);

(e) means to combine the logical address of said new destination page with said updated index value to generate an up-dated pointer which indicates the logical address of said new destination data (word, character).

2. The system of claim 1 wherein said means to search includes:

(a) extract logic means for distributing the fields of said original pointer to said cache means and to an update index logic means;

(b) control logic means for selecting when a pointer update operation is required and for determining whether the new logical address is present in said cache means and, if not, to fetch data from main memory to load into said cache means.

3. The system of claim 1 wherein said means to update includes:
(a) update index logic means for adding an index value to said original pointer's word/character index value to form a new destination word index, a new destination character index and incremental page index.

4. The system of claim 3 wherein said means to combine includes:
(a) insert logic means for receiving said logical address from said cache means and for overwriting the original pointer with the logical address of the destination page together with the updated index value to target a data word in said destination page.

5. The system of claim 4 wherein said cache means includes:
(a) a first CAM holding frequently used logical addresses of page tables located in said main memory which page tables provide logical addresses for each page in a segment;
(b) a second CAM holding the page index of each page which has logical addresses stored in said first RAM;
(c) a first RAM for storing frequently used logical addresses of pages and page tables which can supply a selected logical address of said destination page to said insert logic means;
(d) a second RAM for storing the page index of each page having a logical address stored in said first CAM and which can supply the page index of said original pointer to said update index logic means.

6. In a computer system having a processor utilizing an original pointer having original fields indicating the logical address of a segment of paged memory together with a location index value for a data word/character and including a main memory means having data words stored in pages situated in segments, said main memory means containing a logical address table of segments and logical address tables of pages, a method of updating pointers in a paged memory system to target a new destination word of a new destination page in a paged-segment, comprising the steps of:
(a) extracting said original fields of said original pointer for distribution to an Actual Segment Descriptor Associated Memory (ASDAM);
(b) receiving information from said processor indicating the logical address of said new destination page and a new index value which locates said new destination word in said new destination page;
(c) searching a cache means to see if the logical address of said new destination page is available to locate a word in said new destination page;
(d) overwriting said original pointer to indicate the logical address of said new destination page and said new destination word.

7. In a computer system having a processor utilizing an original pointer with a logical address and an original page index value therein, said processor generating an incremental page index value and including a main memory means having data words stored in pages situated in segments, said main memory means containing a table of logical addresses of segments and tables of page logical addresses, an updating method for a pointer to select new data with a new destination logical address when the next selected new data requested by said processor involves a page crossing, comprising the steps of:

(a) using the logical page address from said original pointer to search a cache means holding portions of a page table of logical addresses of pages to look for a match in the. logical addresses;
(b) using the result of the match said in logical addresses to obtain a page table logical address and said original pointer's page index value from said cache means;
(c) adding said original pointer's page index value to the incremental page index value from an update index logic means to establish a new destination page index value;
(d) searching said cache means to find a matching page table logical address and to find a matching destination page index value;
(e) selecting a destination page logical address, when a dual match occurs in step (d), for overwriting said original pointer.

8. In a computer system having a processor utilizing an original pointer which provides fields for a page bit, an index bit, size of data sought, a original word/character index value, and a new logical address and new index value of new destination data sought, said system including a main memory means having data words stored in pages located in defined segments and wherein said main memory means contains logical address tables of pages and a logical address table of segments, a method for updating the logical address of an original pointer comprising the steps of:
(a) transmitting, from said processor, said original pointer to an insert logic means;
(b) transmitting, from said processor, a new index value to a dual ported page cache CAM means holding frequently used logical page addresses, logical page table addresses, and page index values;
(c) transmitting, via an extract logic means, said original pointer's index value, and information on the bit size of data sought to an update index logic means;
(d) searching said dual ported page cache CAM means with the logical page address from said original pointer to find a match;
(e) selecting, if a match occurs, a page table logical address location for transmission to a dual ported RAM means, and selecting the original page index value for transmission to said update index logic means;
(f) selecting, via said update index logic means, a destination new page index value for transmittal to an insert logic means;
(g) transmitting from said dual ported page cache CAM means, the logical address of the new destination page holding the new data sought, to said insert logic means;
(h) combining the logical address of the said new destination page with said new index value, from said update index logic means, to generate an updated pointer which reflects the logical address location of the new data sought.

9. The method of claim 8 which includes the steps of:
(i) retrieving, from said main memory means, the logical page address of a destination page not presently available in said dual ported page cache CAM means;
(j) placing the retrieved logical page address into said dual ported page cache CAM means for storage.

* * * * *